US012675555B2

(12) United States Patent  
Nahulan et al.

(10) Patent No.: US 12,675,555 B2  
(45) Date of Patent: Jul. 7, 2026

(54) MONITORING DIGITAL ASSETS

(71) Applicant: International Business Machines Corporation, Armonk, NY (US)

(72) Inventors: Jessica Nahulan, Vaughan (CA); Hamid Majdabadi, Ottawa (CA); Carolina Garcia Delgado, Zapopan (MX); Jacob Ryan Jepperson, St. Paul, MN (US); Narayana Aditya Madineni, Ferny Hills (AU)

(73) Assignee: International Business Machines Corporation, Armonk, NY (US)

( * ) Notice: Subject to any disclaimer, the term of this patent is extended or adjusted under 35 U.S.C. 154(b) by 57 days.

(21) Appl. No.: 18/985,179

(22) Filed: Dec. 18, 2024

(65) Prior Publication Data

US 2026/0170097 A1 Jun. 18, 2026

(51) Int. Cl.  
*G06F 21/10* (2013.01)

(52) U.S. Cl.  
CPC .................................. *G06F 21/106* (2023.08)

(58) Field of Classification Search  
CPC .................................................... G06F 21/106  
See application file for complete search history.

(56) References Cited

U.S. PATENT DOCUMENTS 11,030,257 B2    6/2021  Dahl et al.  
11,526,912 B2   12/2022  Garthwaite et al.  
12,393,550 B2 *  8/2025  Berman ................ G06F 16/122  
(Continued)

FOREIGN PATENT DOCUMENTS

CN    101783873  A    7/2010  
CN    116932632  A   10/2023  
(Continued)

OTHER PUBLICATIONS

Disclosed Without Attribution, IP.com No. IPCOM000273566D "Intelligent Image Management System with Adaptive AI-Driven Tagging for Enhanced Retrieval Efficiency", Jan. 3, 2024, 3 pages.  
(Continued)

*Primary Examiner* — Chau Le  
(74) *Attorney, Agent, or Firm* — Cantor Colburn LLP; Aaron Pontikos

(57) ABSTRACT

An example method includes training a digital asset artificial intelligence model to automatically tag digital assets with descriptive tags corresponding to relevant contextual information associated with the digital assets. The method further includes detecting usage of at least one digital asset of the digital assets and analyzing, using the digital asset AI model, the usage by analyzing the descriptive tags corresponding to relevant contextual information associated with the at least one of the digital assets detected as being used to identify anomalies. The method further includes, responsive to identifying an anomaly associated with the at least one digital asset, determining, using the digital asset AI model, whether the anomaly exceeds a predetermined sensitivity threshold, and responsive to determining that the anomaly associated with the at least one digital asset exceeds the predetermined sensitivity threshold, generating, using the digital asset AI model, a real-time remediation action based on the anomaly.

20 Claims, 4 Drawing Sheets

(56) References Cited

U.S. PATENT DOCUMENTS

| | | | |
|---|---|---|---|
| 2015/0294233 A1* | 10/2015 | Aultman | G06F 16/38 |
| | | | 706/12 |
| 2019/0005032 A1* | 1/2019 | Ben-Yair | A61B 5/1114 |
| 2022/0374590 A1* | 11/2022 | Seth | G09B 5/06 |
| 2023/0281068 A1* | 9/2023 | Friedrich | G06F 11/076 |
| | | | 714/57 |
| 2024/0012864 A1 | 1/2024 | Siegel et al. | |
| 2025/0094541 A1* | 3/2025 | Richards | G06F 21/106 |
| 2025/0168056 A1* | 5/2025 | Lasso | H04L 41/142 |
| 2025/0218226 A1* | 7/2025 | Marshalkin | H04L 63/08 |

FOREIGN PATENT DOCUMENTS

| | | |
|---|---|---|
| CN | 116415017 B | 3/2024 |
| IN | 202341086252 A | 12/2023 |

OTHER PUBLICATIONS

Disclosed Without Attribution. IP.com No. IPCOM000258026D "Method and System for Providing Image Tagging Classification using Natural Language Understanding (NLU) of Contextual Information", Apr. 1, 2019. 4 pages.

IBM. "Securing Hybrid Cloud and AI", Enterprise Security Solutions, 2024, 23 pages.

IBM. "What is Digital Asset Management?", Digital asset management, retrieved from web dated Sep. 10, 2024, 12 pages.

Qi et al. "Sniffer: Multimodal Large Language Model for Explainable Out-of-Context Misinformation Detection", arXiv:2403.03170 [cs.MM], Mar. 5, 2024, 11 pages.

Utermohlen et al. "Legendary Trader: Buy These Three Stocks Before this September Event", Starbucks Says 'Dreamer Day' Promotion Is Fake | InvestorPlace, Aug. 7, 2017, 2 pages.

Vanian Jonathan. "IBM Suspends Advertising on X After Report Says Ads Ran Next to Antisemitic Content", Tech, Nov. 16, 2023, 7 pages.

* cited by examiner

100

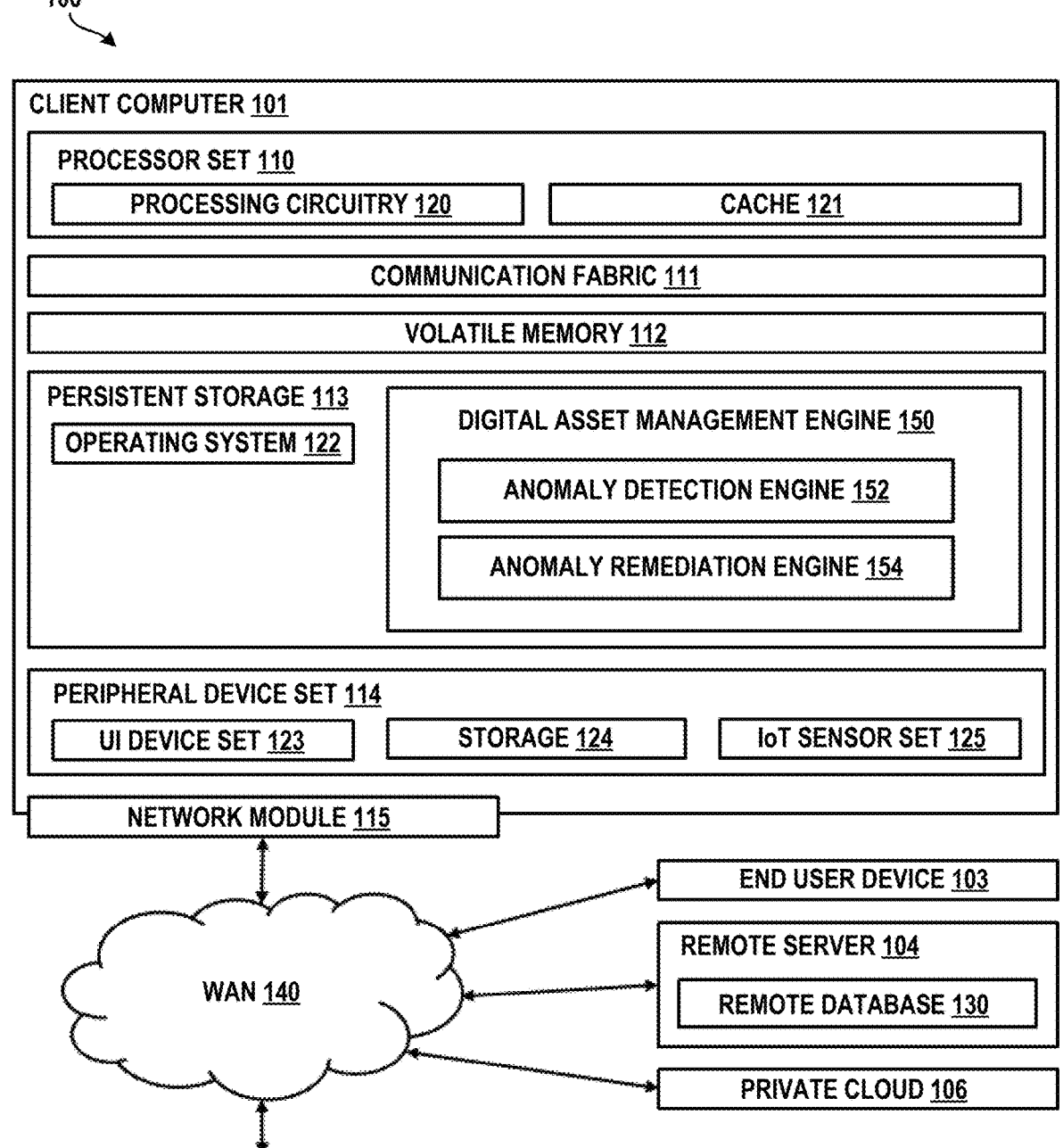

CLIENT COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

DIGITAL ASSET MANAGEMENT ENGINE 150

ANOMALY DETECTION ENGINE 152

ANOMALY REMEDIATION ENGINE 154

PERIPHERAL DEVICE SET 114

UI DEVICE SET 123          STORAGE 124          IoT SENSOR SET 125

NETWORK MODULE 115

WAN 140

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOT PHYSICAL MACHINE SET 142

VIRTUAL MACHINE SET 143          CONTAINER SET 144

FIG. 1

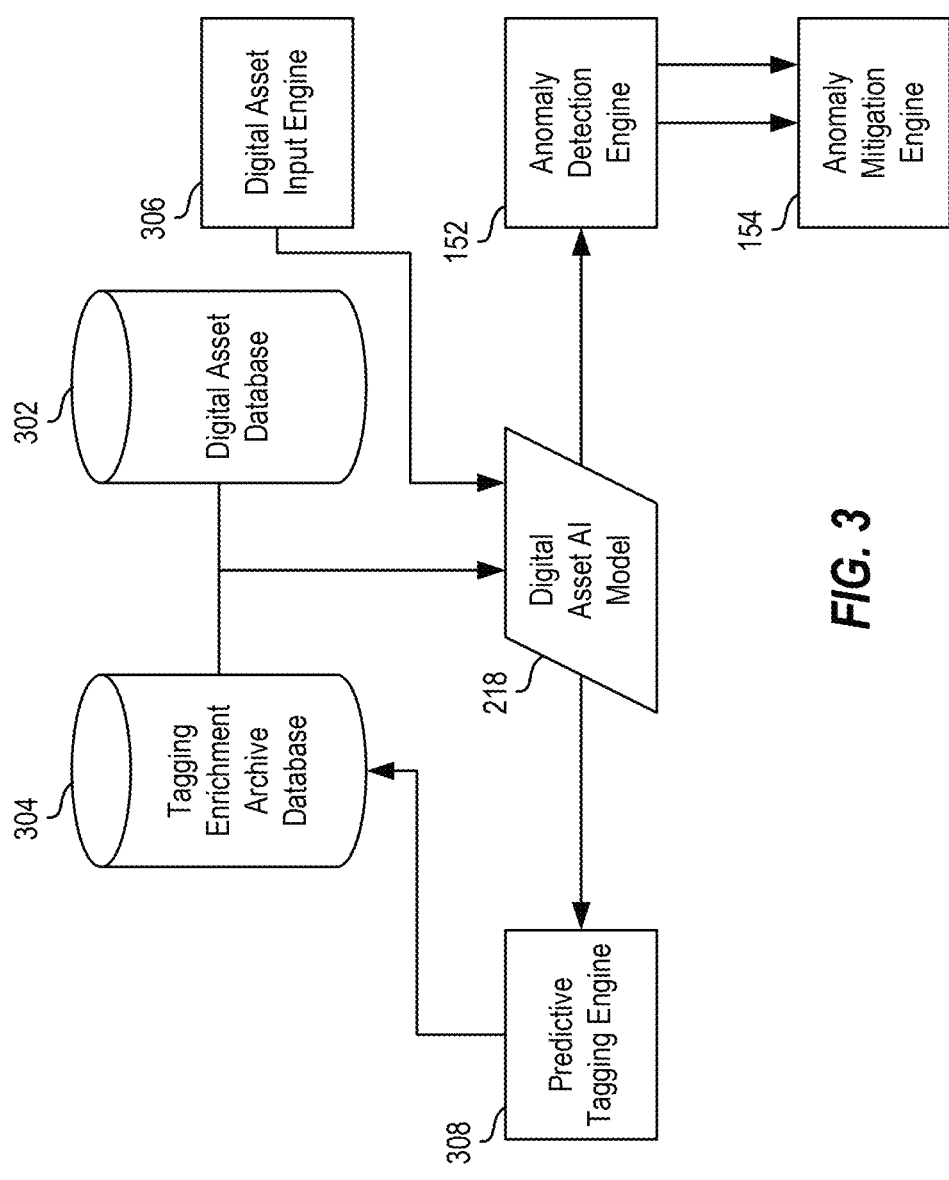
*FIG. 3*

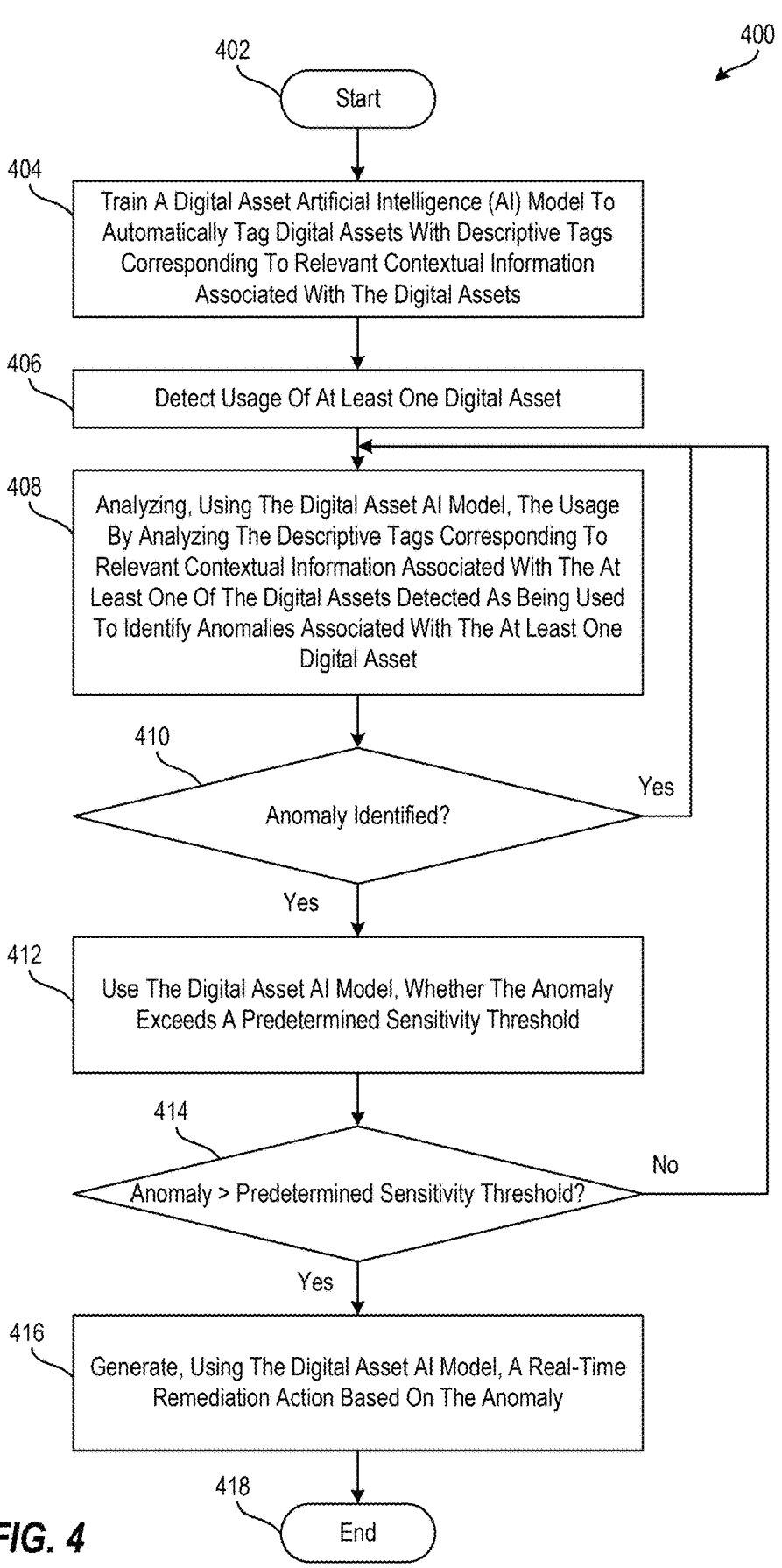

402

Start

404

Train A Digital Asset Artificial Intelligence (AI) Model To Automatically Tag Digital Assets With Descriptive Tags Corresponding To Relevant Contextual Information Associated With The Digital Assets

406

Detect Usage Of At Least One Digital Asset

408

Analyzing, Using The Digital Asset AI Model, The Usage By Analyzing The Descriptive Tags Corresponding To Relevant Contextual Information Associated With The At Least One Of The Digital Assets Detected As Being Used To Identify Anomalies Associated With The At Least One Digital Asset

410

Anomaly Identified?

Yes

Yes

412

Use The Digital Asset AI Model, Whether The Anomaly Exceeds A Predetermined Sensitivity Threshold

414

Anomaly > Predetermined Sensitivity Threshold?

No

Yes

416

Generate, Using The Digital Asset AI Model, A Real-Time Remediation Action Based On The Anomaly

418

End

MONITORING DIGITAL ASSETS

BACKGROUND

The present disclosure relates to computing systems, and more specifically, to monitoring digital assets.

In the digital age, digital assets, such as text, images, and videos, play a role in corporate branding, advertising, and content creation. Companies invest significantly in these assets to represent their brand identity, communicate with their target audience, and differentiate themselves in a crowded marketplace. The widespread distribution and accessibility of digital media have led to challenges in controlling how, where, and in what context these assets are used.

SUMMARY

In one embodiment, a method is provided. The method includes training a digital asset artificial intelligence (AI) model to automatically tag digital assets with descriptive tags corresponding to relevant contextual information associated with the digital assets. The method further includes detecting usage of at least one digital asset of the digital assets. The method further includes analyzing, using the digital asset AI model, the usage by analyzing the descriptive tags corresponding to relevant contextual information associated with the at least one of the digital assets detected as being used to identify anomalies associated with the at least one digital asset. The method further includes, responsive to identifying an anomaly associated with the at least one digital asset, determining, using the digital asset AI model, whether the anomaly exceeds a predetermined sensitivity threshold. The method further includes, responsive to determining that the anomaly associated with the at least one digital asset exceeds the predetermined sensitivity threshold, generating, using the digital asset AI model, a real-time remediation action based on the anomaly.

Other embodiments described herein implement features of the above-described method in computer systems and computer program products.

The above features and advantages, and other features and advantages, of the disclosure are readily apparent from the following detailed description when taken in connection with the accompanying drawings.

BRIEF DESCRIPTION OF THE DRAWINGS

The specifics of the exclusive rights described herein are particularly pointed out and distinctly claimed in the claims at the conclusion of the specification. The foregoing and other features and advantages of one or more embodiments described herein are apparent from the following detailed description taken in conjunction with the accompanying drawings in which:

FIG. 1 illustrates a computing environment, according to an embodiment;

FIG. 3 illustrates a block diagram of a system for monitoring digital assets, according to an embodiment; and FIG. 4 illustrates a flow diagram of a method for monitoring digital assets, according to an embodiment.

Figure 2:
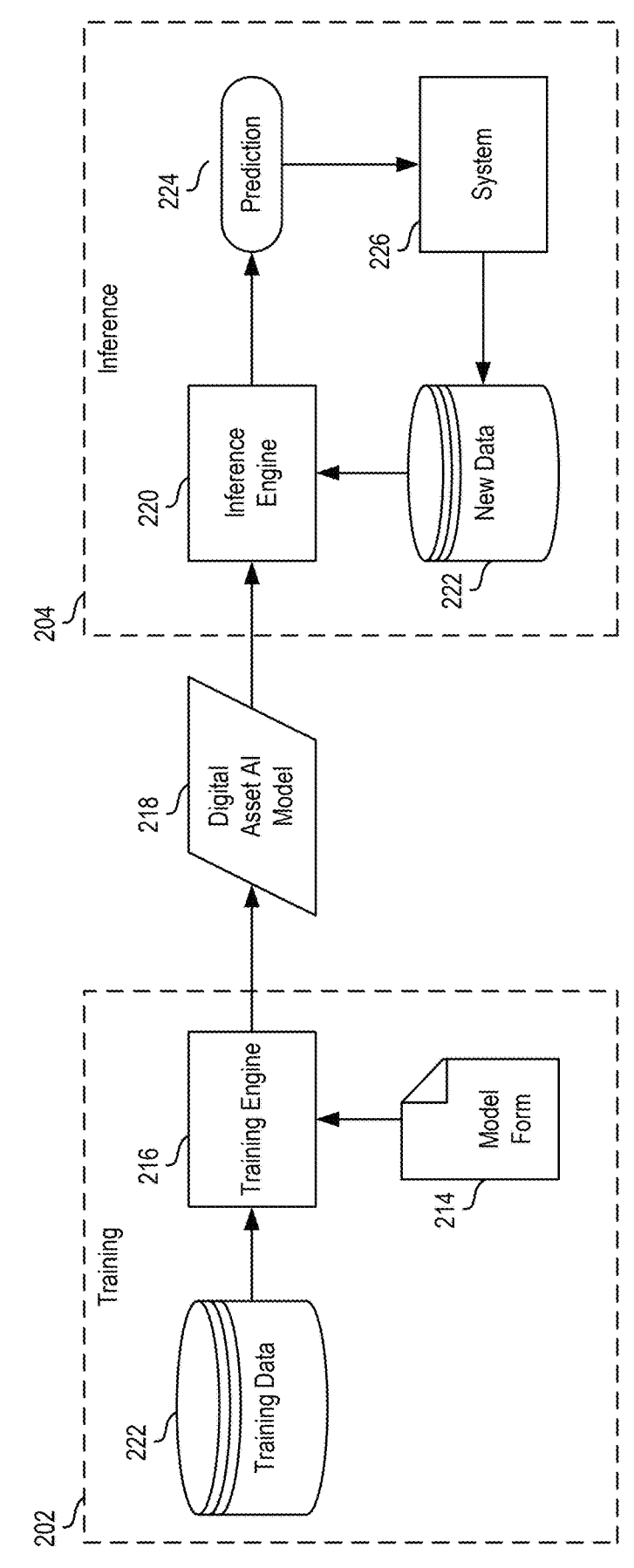
FIG. 2 illustrates a block diagram of components of a machine learning training and inference system, according to an embodiment.

The detailed description explains embodiments of the disclosure, together with advantages and features, by way of example with reference to the drawings.

DETAILED DESCRIPTION

Descriptions of various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to an embodiment. Computing environment 100 contains an example of an environment for the execution of at least some of the computer code involved in performing the inventive methods, such as a digital asset management engine 150, which may be used to perform digital asset management, including anomaly detection using an anomaly detection engine 152 and anomaly remediation using an anomaly remediation engine 154. In addition to digital asset management engine 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and digital asset management engine 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in digital asset management engine 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in digital asset management engine 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer, and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

One or more embodiments described herein can utilize machine learning techniques to perform tasks, such as monitoring digital assets. More specifically, one or more embodiments described herein can incorporate and utilize rule-based decision making and artificial intelligence (AI) reasoning to accomplish the various operations described herein, namely monitoring digital assets. The phrase "machine learning" broadly describes a function of electronic systems that learn from data. A machine learning system, engine, or module can include a trainable machine learning algorithm that can be trained, such as in an external cloud environment, to learn functional relationships between inputs and outputs, and the resulting model (sometimes referred to as a "trained neural network," "trained model," and/or "trained machine learning model") can be used for monitoring digital assets, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input. It should be appreciated that these same techniques can be applied in the case of monitoring digital assets as described herein.

The widespread distribution and accessibility of digital media have led to challenges in controlling how, where, and in what context these assets are used. Unauthorized use, misrepresentation, or association with undesirable content of a digital access can harm a brand's reputation, dilute the brand's message, and lead to legal complexities. The rapid evolution of social media and digital platforms has exponentially increased the avenues where these digital assets can be displayed, often outside the direct control of the owning entity, and the speed with which such use occurs. Existing solutions for monitoring and controlling digital asset use are often reactive, involving cumbersome manual tracking or after-the-fact legal action, which can be both time-consuming and inefficient.

More particularly, problem lies in the lack of control over the context in which digital assets, such as those owned by a corporation or other entity, are used once those digital assets are released into the digital ecosystem. While copyright laws provide some protection, the judicial system may not be sufficient or timely to address the nuanced issues of brand misalignment, ethical misuse, or contextually inappropriate associations. The dynamic and ever-changing landscape of public sentiment, social trends, and ethical standards makes monitoring challenging for companies to manually monitor and respond to every instance of their digital asset's usage. This situation creates a significant gap in digital asset management, posing risks to brand integrity, public perception, and ethical business practices.

Legacy approaches to digital asset management (DAM) primarily focus on storing and identifying digital assets using basic metadata, such as file name, date, and file type. These approaches lack the ability to adapt to modern-day requirements and effectively prevent exploitation and manipulation of digital assets. Such approaches miss elements used for protecting assets from evolving approaches that may impact brand identity. Furthermore, legacy approaches lack the capability to integrate with existing third-party tools and platforms that leverage large-scale enterprise implementation and cross-platform monitoring ability. Such approaches for monitoring and controlling digital asset use are reactive rather than proactive, often involving cumbersome manual tracking or after-the-fact legal action, which can be both time-consuming and inefficient. In many cases, some of the damage has already been done by the time the respective media item has been identified and the process to take the asset down has been completed.

There remains a need for a technology-driven solution that empowers companies with immediate control and decision-making capabilities regarding their digital assets' usage in various contexts.

One or more embodiments described herein provide for enterprise-level digital asset management that utilizes artificial intelligence for tagging, tracking, and preventing misuse, misalignment, ethical misuse, or contextually inappropriate associations of a entity's digital assets. One or more embodiments leverages AI-driven contextual analysis architecture to provide entities with dynamic proactive control over their digital image and video assets. One or more embodiments serves as a protective measure for brand integrity in an era where digital content is prone to manipulation, misuse, and unregulated sharing. One or more embodiments incorporates automated tagging, contextual AI, in-context learning, and anomaly detection to enhance the management and utilization of digital assets. An anomaly is any undesirable, unauthorized, improper, and/or unintended use of a digital asset as determined by the owner of the digital asset. By implementing one or more embodiments described herein, entities can harness the power of artificial intelligence to automate the tagging process, improve metadata quality, and enhance the overall management and utilization of digital assets within a DAM system.

Systems for training and using a machine learning model are now described in more detail with reference to FIG. 2. Particularly, FIG. 2 depicts a block diagram of components of a machine learning training and inference system 200 according to one or more embodiments described herein. The machine learning training and inference system 200 performs training 202 and inference 204. During training 202, a training engine 216 trains a model (e.g., the digital asset AI model 218) to perform a task, such as to monitoring digital assets. Inference 204 is the process of implementing the digital asset AI model 218 to perform the task, such as to monitoring digital assets, in the context of a larger system (e.g., a system 226, which provides for a comprehensive digital asset management framework designed to enhance the control and utilization of multimedia content, such as digital assets). All or a portion of the machine learning training and inference system 200 shown in FIG. 2 can be implemented, for example by all or a subset of the digital asset management engine 150 of FIG. 1. According to one or more embodiments, monitoring digital assets can include, for example, performing real-time context-aware digital assessment management to identify and prevent misuse of a digital asset.

The training 202 begins with training data 212, which may be structured or unstructured data. According to one or more embodiments described herein, the training data 212 includes digital assets (e.g., text, videos, audio recordings, animations, and/or the like, including combinations and/or multiples thereof) and associated tags. "Tags" refer to metadata labels assigned to digital assets and describe their content, context, and usage. Tags are generated manually and/or automatically (as described herein) and are useful for categorizing and retrieving digital assets efficiently and for monitoring digital assets that are in use. Tags can be descriptive tags (e.g., tags that describe the content of a digital access, such as "corporate logo"), contextual tags (e.g., tags that provide information about the context in which the digital asset is used, such as "social media campaign"), sentiment tags (e.g., tags that capture the public sentiment or feedback associated with the digital asset, such as "positive reception"), usage tags (e.g., tags that indicate how the digital asset is being utilized, such as "featured in a blog post"), and/or the like, including combinations and/or multiples thereof.

The training engine 216 receives the training data 212 and a model form 214. According to one or more embodiments described herein, the model form 214 represents a base model that is untrained. The model form 214 can have preset weights and biases, which can be adjusted during training. It should be appreciated that the model form 214 can be selected from many different model forms depending on the task to be performed. For example, where the training 202 is to train a model to monitor digital assets, the model form 214 may be a model form of an attention generative adversarial network (GAN) model, although other types of model forms and/or algorithms can be implemented.

According to one or more embodiments described herein, the model form 214 represents an algorithm that can be trained to perform a particular task. In some embodiments, the model form 214 is an algorithm that can include, for example, supervised learning algorithms, unsupervised learning algorithm, artificial neural network algorithms, association rule learning algorithms, hierarchical clustering algorithms, cluster analysis algorithms, outlier detection algorithms, semi-supervised learning algorithms, reinforcement learning algorithms and/or deep learning algorithms. Examples of supervised learning algorithms can include, for example, AODE; Artificial neural network, such as Backpropagation, Autoencoders, Hopfield networks, Boltzmann machines, Restricted Boltzmann Machines, and/or Spiking neural networks; Bayesian statistics, such as Bayesian network and/or Bayesian knowledge base; Case-based reasoning; Gaussian process regression; Gene expression programming; Group method of data handling (GMDH); Inductive logic programming; Instance-based learning; Lazy learning; Learning Automata; Learning Vector Quantization; Logistic Model Tree; Minimum message length (decision trees, decision graphs, etc.), such as Nearest Neighbor algorithms and/or Analogical modeling; Probably approximately correct learning (PAC) learning; Ripple down rules, a knowledge acquisition methodology; Symbolic machine learning algorithms; Support vector machines; Random Forests; Ensembles of classifiers, such as Bootstrap aggregating (bagging) and/or Boosting (meta-algorithm); Ordinal classification; Information fuzzy networks (IFN); Conditional Random Field; ANOVA; Linear classifiers, such as Fisher's linear discriminant, Linear regression, Logistic regression, Multinomial logistic regression, Naive Bayes classifier, Perceptron, and/or Support vector machines; Quadratic classifiers; k-nearest neighbor; Boosting; Decision trees, such as C4.5, Random forests, ID3, CART, SLIQ, and/or SPRINT; Bayesian networks, such as Naive Bayes; and/or Hidden Markov models. Examples of unsupervised learning algorithms can include Expectation-maximization algorithm; Vector Quantization; Generative topographic map; and/or Information bottleneck method. Examples of artificial neural network can include Self-organizing maps. Examples of association rule learning algorithms can include Apriori algorithm; Eclat algorithm; and/or FP-growth algorithm. Examples of hierarchical clustering can include Single-linkage clustering and/or Conceptual clustering. Examples of cluster analysis can include K-means algorithm; Fuzzy clustering; DBSCAN; and/or OPTICS algorithm. Examples of outlier detection can include Local Outlier Factors. Examples of semi-supervised learning algorithms can include Generative models; Low-density separation; Graph-based methods; and/or Co-training. Examples of reinforcement learning algorithms can include Temporal difference learning; Q-learning; Learning Automata; and/or SARSA. Examples of deep learning algorithms can include Deep belief networks; Deep Boltzmann machines; Deep Convolutional neural networks; Deep Recurrent neural networks; and/or Hierarchical temporal memory.

According to one or more embodiments described herein, the model form 214 is a foundational model that is trained on a wide variety of generalized, unlabeled training data to perform one or more different general tasks, such as generating content (text, images, etc.), performing natural language processing, and/or the like including combinations and/or multiples thereof. In the case of the model form 214 being a foundational model, the training 202 can include tuning the foundational model (e.g., the model form 214) using the training data 212. Tuning the foundational model provides the benefits of the broad capabilities of the foundational model while enabling the foundational model to be customized using training data (e.g., the training data 212) related to a particular task or environment to which the foundational modal is then applied. In this way, the training 202 need not train a new model from scratch, which is time-consuming and resource intensive.

The training 202 can be supervised learning, semi-supervised learning, unsupervised learning, reinforcement learning, and/or the like, including combinations and/or multiples thereof. For example, supervised learning can be used to train a machine learning model to monitor digital assets. To do this, the training data 212 includes digital assets and associated tags, which together serves as a ground truth. In this example, the training engine 216 takes as input a digital asset from the training data 212, makes a prediction for generating a tag for the digital asset, and compares the prediction to the known tag (e.g., ground truth). The training engine 216 then adjusts weights and/or biases of the model based on results of the comparison, such as by using backpropagation. The training 202 may be performed multiple times (referred to as "epochs") until a suitable model is trained (e.g., the digital asset AI model 218).

Once trained, the digital asset AI model 218 can be used to perform inference 204 to perform a task, such as to monitor digital assets as described herein. The inference engine 220 applies the digital asset AI model 218 to new data 222 (e.g., real-world, non-training data). For example, if the digital asset AI model 218 is trained to monitor digital assets, the new data 222 can be a new digital asset that was not part of the training data 212. In this way, the new data 222 represents data to which the digital asset AI model 218 has not been exposed. The inference engine 220 makes a prediction 224 (e.g., a tag associated with the new digital asset (e.g., the new data 222)) and passes the prediction 224 (e.g., tag) to the system 226 (e.g., the computer 101 of FIG. 1). The system 226 can, based on the prediction 224, taken an action, perform an operation, perform an analysis, and/or the like, including combinations and/or multiples thereof. In some embodiments, the system 226 can add to and/or modify the new data 222 based on the prediction 224.

In accordance with one or more embodiments, the predictions 224 generated by the inference engine 220 are periodically monitored and verified to ensure that the inference engine 220 is operating as expected. Based on the verification, additional training 202 may occur using the digital asset AI model 218 as the starting point. The additional training 202 may include all or a subset of the original training data 212 and/or new training data 212. In accordance with one or more embodiments, the training 202 includes updating the digital asset AI model 218 to account for changes in expected input data.

Turning now to FIG. 3, the system 226 of FIG. 2 is described in more detail. The system 226 provides for a comprehensive digital asset management framework designed to enhance the control and utilization of multimedia content, such as digital assets, according to one or more embodiments.

The digital asset database 302 functions as a central repository of digital assets, securely storing a wide array of digital assets, including images, videos, and documents. The digital asset database 302 stores digital assets, metadata associated with digital assets, and/or the like, including combinations and/or multiples thereof. This database ensures that digital assets are readily accessible for processing and retrieval.

A digital asset input engine 306 handles the ingestion of new digital assets, which can be input into the digital asset AI model 218 and/or stored in the digital asset database 302. The digital asset input engine 306 can perform AI content recognition, provide dynamically captured contextual data, and/or the like, including combinations and/or multiples thereof. The digital asset input engine 306 processes incoming files, extracting initial metadata and preparing them for further analysis by the AI model.

The system 226 utilizes the digital asset AI model 218 to detect and remediate anomalies of digital assets. The digital asset AI model 218 is useful for contextual analysis, enabling the system to understand and categorize assets based on their content and usage context. The digital asset AI model 218 can include one or more predetermined sensitivity threshold(s) (also referred to as "risk threshold(s)"), which are described further herein. The predetermined sensitivity threshold(s) can be used to perform training 202, which may include generator training and/or discriminator training. The digital asset AI model 218 can also be autonomously improved as is further described herein. The digital asset AI model 218 leverages AI technologies to manage metadata associated with digital assets, ensuring consistency, accuracy, and completeness. AI can reduce human errors and inconsistencies in metadata creation, improving the overall quality of metadata.

According to one or more embodiments, the digital asset AI model 218 employs advanced machine learning algorithms to automatically tag digital assets with descriptive metadata. For example, the digital asset AI model 218 can implement AI-powered image recognition and natural language processing (NLP) to automatically tag digital assets upon ingestion into the DAM system. According to one or more embodiments, the digital asset AI model 218 can recognize objects, places, and other relevant elements within the digital assets, and generate descriptive tags without human intervention. According to one or more embodiments, the digital asset AI model 218 can learn from user searches and update tags to match search intent. This involves using AI to analyze user search patterns and refine the tagging taxonomy based on user interactions. The digital asset AI model 218 can autonomously improve tagging accuracy over time by learning from user interactions and feedback for example. For example, the digital asset management engine 150 can monitor, review, and refine the suggested tags over time, allowing the digital asset AI model 218 to learn from approved or rejected tags. This iterative process helps improve the accuracy and relevance of automated tags, enhancing asset discovery.

To enhance the metadata associated with each asset, the tagging enrichment archive database 304 stores tags and contextual information. The tagging enrichment archive database 304 stores one or more of tagging standards, tagging rules and frameworks, cached contextualized data, natural language processing tag translations, training data (e.g., tags with context), and/or the like, including combinations and/or multiples thereof. This database supports the searchability and discoverability of assets, allowing users to efficiently locate and utilize content based on detailed metadata.

The predictive tagging engine 308 works utilizes the digital asset AI model 218 to anticipate future tagging for digital assets. By analyzing trends and user behavior (e.g., searches), the predictive tagging engine 308 suggests relevant tags for new content, ensuring that the tagging process remains dynamic and aligned with current usage patterns. The predictive tagging engine 308 performs automated tagging by performing predictive tagging based on trend/usage-patterns and/or perform context and sentiment aware tagging. The tags generated by the predictive tagging engine 308 can be used by the digital asset AI model 218 to perform autonomous improvement of the digital asset AI model 218.

The anomaly detection engine 152 monitors the usage of digital assets by continuously scanning for unusual patterns or anomalies in digital asset usage, leveraging the descriptive tags and contextual data to identify anomalies (e.g., misuse or manipulation). For example, if an entity issues a press release and a certain term of phrase becomes the subject of viral speculation, misinterpretation, or otherwise unintended reactions, the press release can be flagged as being anomalous, for example, based on detected trends in social media networks. The anomaly detection engine 152 can deploy the digital asset AI model 218 (e.g., an attention GAN) to perform anomaly detection.

When an anomaly is detected, the anomaly remediation engine 154 evaluates the severity of the anomaly against a predetermined sensitivity threshold and determines the appropriate remediation action, such as altering, relocating, or removing the asset, to protect brand integrity and prevent unauthorized use. For example, in the case of the example press release, the anomaly remediation engine 154 can generate as alert to the entity that generated the press release, can autonomously edit the press release, can generate a new or replacement press release, can delete the press release, and/or the like, including combinations and/or multiples thereof. The anomaly remediation engine 154 can issue alerts, perform digital asset monitor, can generate risk-based action recommendations, and/or the like, including combinations and/or multiples thereof.

Inputs to the system 226 can include one or more of the following: digital assets (e.g., images, videos, audio, documents, etc.) to be ingested into the system 226; existing metadata associated with the digital assets, such as one or more of tags, descriptions, and other relevant information; user interactions and search patterns, which provide insights into user behavior and preferences; controlled vocabulary and predefined tagging standards to guide the automated tagging process (e.g., implement controlled vocabulary in conjunction with AI keywording to restrict and standardize the keywords used for tagging to ensure that the tagging process aligns with predefined standards and guidelines, enhancing the consistency of tags); contextual data, such as one or more of information about the user, time, place, and/or overall atmosphere of the dialogue, to enable contextual AI for more accurate tagging and metadata enrichment; in-context learning information, which enables the system 226 to learn and adapt based on the context of user interactions and asset utilization, allowing for continuous improvement of the tagging taxonomy; and/or the like, including combinations and/or multiples thereof.

Outputs of the system 226 can include one or more of the following: automatically generated tags and descriptive metadata for each digital asset, enriched with contextual information for improved searchability and discoverability (e.g., by automating tagging and improving metadata quality, AI-infused DAM systems significantly enhance the searchability and discoverability of assets, which leads to more efficient asset retrieval and utilization, benefiting internal teams and external stakeholders); improved metadata quality, ensuring consistency, accuracy, and completeness of metadata associated with digital assets, incorporating contextual insights for more relevant tagging; enhanced user experience through more efficient asset retrieval and utilization within the system 226, leveraging contextual AI to provide more personalized and relevant asset recommendations; insights into user behavior and preferences based on the contextual AI and in-context learning, enabling continuous improvement of the tagging taxonomy based on evolving contextual patterns; and/or the like, including combinations and/or multiples thereof.

According to one or more embodiments, the system 226 provides for the reduction of manual effort and human error in the tagging and metadata management processes, leading to increased efficiency and productivity within the organization, with the AI system adapting and learning in-context to optimize tagging and metadata enrichment. For example, AI-infused automated tagging reduces the manual effort used for tagging and metadata management, minimizing human input errors and streamlining DAM workflows. This results in increased efficiency and productivity.

Further features of the system 226 are now described with reference to FIGS. 1 and 2. More particularly, the system 226 supports an AI-infused DAM approach that incorporates automated tagging, contextual AI, in-context learning, an attention GAN for anomaly detection, and automated response/remediation. This proactive strategy aims to detect and mitigate digital asset misrepresentation and misappropriation by leveraging advanced AI capabilities to identify anomalies, trigger automated actions based on predefined risk thresholds, and proactively address potential issues within the digital asset ecosystem. According to one or more embodiments, the system 226 can be used by enterprises or other entities to effectively implement an AI-infused DAM approach with automated tagging, contextual AI, in-context learning, the integration of an attention-GAN for anomaly detection, and automated response/remediation based on detected risk thresholds, enhancing the searchability, discoverability, relevance of digital assets, and the ability to proactively identify and mitigate anomalies within the DAM system.

To assess data and metadata requirements, the system 226 reviews existing digital assets and associated metadata to understand the scope and diversity of the content. The system 226 identifies contextual data elements, such as user context, time, and location, that can enhance the tagging and metadata enrichment process.

In model training (e.g., training 202), self-improving algorithms are employed. A generator, which is part of the digital asset AI model 218, is trained to produce data mimicking normal interactions with digital assets, while a discriminator, which is also part of the digital asset AI model 218, is trained to distinguish between real and generated interactions, focusing on features that indicate misuse (e.g., anomalies). Risk thresholds are set based on the enterprise sensitivity of the content, integrated with the training engine 216, for each content. The system 226 autonomously improves tagging accuracy over time by learning from user interactions and feedback.

Contextual and predictive insight is achieved through AI that goes beyond keyword recognition to understand the context and sentiment of the content, providing nuanced tags. The digital asset AI model 218 predicts future tagging needs based on trends and user behavior, preemptively suggesting tags for new content (digital assets). The AI-infused DAM solution with automated tagging involves defining a contextual tagging framework that incorporates automated tagging, contextual AI, an attention GAN for anomaly detection, and automated response/remediation to enrich metadata with relevant contextual information and enable automated actions based on risk thresholds. Tagging rules and frameworks are established within the system 226 to guide the digital asset AI model 218 in automatically assigning relevant metadata tags to assets. According to one or more embodiments, pre-trained AI models are integrated into the system 226 to enable rapid generation of metadata tags for digital assets in multiple languages, significantly reducing manual efforts and costs. AI content recognition tools automatically tag images, videos, and text-based assets with intelligent, business-specific keywords, enhancing the depth and accuracy of tagging. AI-powered auto-tagging features analyze media files and suggest metadata tags based on the content, enabling efficient and intelligent categorization of assets. AI models, such as the digital asset AI model 218, are trained to ensure accurate and precise tagging by providing consistent and distinctive content for evaluation, allowing the AI to effectively auto-tag assets. Smart tags are regularly moderated and refined to improve tag-based searches and ensure that assets appear in search results for the most relevant tags, enhancing the accuracy of auto-tagging. The digital asset AI model 218 is capable of analyzing and correlating information across different types of digital assets (e.g., text, images, audio, video, animations, and/or the like, including combinations and/or multiples thereof) to generate comprehensive tags.

For anomaly detection, an AI-infused DAM solution is evaluated and selected, offering advanced automated tagging capabilities alongside contextual AI for enhanced metadata enrichment and integrating an attention GAN for anomaly detection, automated response, and remediation based on risk thresholds. The trained attention GAN model (e.g., the digital asset AI model 218) is deployed to monitor interactions with digital assets in real-time. The attention GAN model can include a discriminator. The discriminator's ability to identify generated (anomalous) interactions is used as a basis for detecting misuse, with anomalies flagged when the discriminator identifies data that significantly deviates from the norm. The chosen solution supports the integration of contextual data, in-context learning, and provides mechanisms for continuous learning, anomaly detection, and automated response based on risk thresholds. Contextual data sources, such as user profiles, location data, and temporal information, are integrated with the system 226 to provide contextual insights for automated tagging, anomaly detection, and automated response/remediation based on risk thresholds according to one or more embodiments. The integration allows for real-time contextual analysis, anomaly detection, and automated actions based on predefined risk thresholds and in-context learning. Automated tagging, contextual AI models, attention GAN, and automated response/remediation are configured and deployed within the system 226 to automate the tagging process, analyze contextual data, detect anomalies, and trigger automated actions based on risk thresholds for optimized metadata enrichment and risk mitigation.

The real-time response and remediation process is implemented based on the outcome of the AI output integrated with the predefined risk factor thresholds of the system 226 and sensitivity level of the digital asset, allowing the system 226 to proactively take action to prevent misrepresentation of the media in real-time. One or more embodiments actively monitors the trained tags to identify anomalies in digital assets' usage and act when a digital asset is tampered with or misrepresented, for example.

The system 226 can also implement in-context continuous learning mechanisms, which continuously adapt the tagging taxonomy based on evolving contextual patterns, user behavior, anomaly detection, and automated response/remediation based on risk thresholds. Feedback loops are implemented to capture user interactions, refine the automated tagging process, anomaly detection, and automated response/remediation, ensuring that the system learns, adapts, and mitigates risks in real time.

The system 226 can implement continuous refinement of the process, which involves conducting extensive testing of the automated tagging, contextual AI, attention GAN, and automated response/remediation capabilities to validate the accuracy, relevance, and effectiveness of the automated tagging process, anomaly detection, and risk mitigation actions. The contextual tagging framework is refined based on testing results, user feedback, risk thresholds, and automated response/remediation, ensuring that the system consistently delivers contextually enriched metadata and effectively mitigates risks based on predefined thresholds.

According to one or more embodiments, the system 226 is capable of outputting a user-defined formatted dashboard that displays and alerts in real-time while monitoring, detecting, and taking actions. The dashboard can indicate any detected anomalies and any remediation actions taken or recommended.

Turning now to FIG. 4, a flow diagram of a method 400 for monitoring digital assets is provided, according to an embodiment. The method 400 can be performed by any suitable computing system, device, or environment, such as those described herein (e.g., the computing environment 100 and/or the computer 101 of FIG. 1). According to one or more embodiments, the method 400 is performed, in whole or in part, using digital asset management engine 150 of FIG. 1.

The method 400 begins at block 402 and proceeds to block 404. At block 404, the method 400 involves training 202 the digital asset AI model 218 to automatically tag digital assets with descriptive tags corresponding to relevant contextual information. For example, the training engine 202 trains the digital asset AI model 218 using training data as described with reference to FIG. 2

At block 406, the method 400 detects the usage of digital assets, monitoring how and where each asset is being utilized. For example, the method 400 can receive notifications from social media networks or other online resources when a digital asset is used. As another example, the monitoring can include crawling the web to identify usages of digital assets, such as those digital assets stored in the digital asset database 302 of FIG. 2.

At block 408, the method 400 analyzes the usage of digital assets detected at block 406 using the AI model. For example, the anomaly detection engine 152 examines the descriptive tags corresponding to relevant contextual information associated with a digital asset to identify any anomalies.

At decision block 410, the method 400 checks if any anomalies have been identified in the usage of the digital assets at block 408. If no anomaly is detected (decision block 410 "No"), the method 400 returns to block 408 and continues. Otherwise, if an anomaly is detected (decision block 410 "Yes"), the method 400 proceeds to block 412, where the anomaly detection engine 152 determines whether the anomaly exceeds a predetermined sensitivity threshold. The predetermined sensitivity threshold is a predefined limit set to evaluate the severity of anomalies detected in the usage of digital assets. It acts as a benchmark to determine whether an anomaly is significant enough to warrant a remediation action. If an anomaly's impact or deviation from expected behavior exceeds this threshold, a real-time response can be triggered to address the anomaly. The predetermined sensitivity threshold helps prioritize actions based on the potential risk or harm to brand integrity, ensuring that only critical anomalies prompt immediate intervention. According to one or more embodiments, the predetermined sensitivity threshold can use multiple subthresholds to trigger different remediation actions. For example, an anomaly that exceeds a lower threshold but not a higher threshold may cause a first remediation action to be implemented, while an anomaly that exceeds both the lower and higher thresholds may trigger a second remediation action to be implemented.

At decision block 414, the method 400 assesses if the identified anomaly surpasses the sensitivity threshold, guiding the response strategy. If the anomaly does not exceed the predetermined sensitivity threshold (decision block 414 "No"), the method 400 returns to block 408 and continues. Otherwise, if the anomaly exceeds the predetermined sensitivity threshold (decision block 414 "Yes"), the method 400 moves to block 416, where the anomaly remediation engine 154 uses the digital asset AI model 218 to generate a real-time remediation action to mitigate the issue. The method 400 then proceeds to block 418.

At block 418, the method 400 concludes, having taken desired actions to manage the digital asset appropriately, completing the method 400.

Additional processes also may be included, and it should be understood that the processes depicted in FIG. 4 represent illustrations, and that other processes may be added or existing processes may be removed, modified, or rearranged without departing from the scope of the present disclosure. It should also be understood that the processes depicted in FIG. 4 may be implemented as programmatic instructions stored on a non-transitory computer-readable storage medium that, when executed by a processor (e.g., the processor set 110, the processing circuitry 120) of a computing system (e.g., the computer 101), cause the processor to perform the processes described herein.

The following use case is an example of an implementation of one or more embodiments described herein.

A user works as a content moderator and digital asset manager at a multinational advertising agency. The user's job tasks include overseeing a large collection of digital assets, which includes ensuring the digital assets are organized, tagged accurately, and accessible for various clients. One of the user's tasks includes moderating how the company's digital assets/advertisements posted in webpages are being received by the public, ensuring they maintain brand image, and ensuring company copyrighted material is used according to corporate guidelines.

The user struggles with this task given the large amount of diverse digital content the user's team manages. By utilizing one or more embodiments described herein, such as the automated tagging capabilities of the digital asset AI model 218, the user can streamline the user's workflow and ensure the integrity of the company's digital assets. This saves the user time and effort in manually reviewing and processing each asset, allowing the user to focus on other higher-value tasks, while improving the accuracy of detection and remediation of anomalies.

Typically, when the company's media and branding is being used inappropriately, the user receives a surge in notices and reports about a particular post either containing inappropriate messaging or being used in an inappropriate or unauthorized contextual manner. These situations usually indicate that the company's brand image is at risk and that a certain corporate digital assets are not being well received by the public. Apart from receiving reactive notices, the user makes an effort to scan popular websites where the user is aware of postings, to monitor for appropriate usage and audience feedback. This manual process typically occurs reactively, and costs the company to appear negatively in news coverage over these incidents, impacting business and potential customers/revenue.

One or more embodiments described herein can be utilized by the user to incorporate anomaly detection mechanisms, flagging any abnormal interactions with digital assets in real-time. This helps the user and the company proactively identify potential misuse or tampering, allowing the user to take immediate action to mitigate risks and protect the company's brand. The system 226 continuously learns from user behavior and adapts its tagging accordingly, ensuring that metadata remains relevant and up-to-date, and ensuring the anomaly detection is capable of detecting current trending incidences of negative sentiment or misuse.

By using one or more of the embodiments described herein, the user is enabled to efficiently manage the company's digital assets, which results in improved metadata accuracy, and to mitigate risks effectively and proactively. The user utilizes the system 226 to automate mitigation actions with rules to define types of incidences which should result in content being automatically removed, proactively maintaining company integrity. The user also uses the system 226 to get an overview of detected anomalies along with their recommended remediation actions.

One or more embodiments provide technical improvements in digital asset management by leveraging AI-driven automated tagging and contextual analysis. One or more embodiments enhance the accuracy and relevance of metadata, allowing for more efficient asset retrieval and utilization. By incorporating self-improving algorithms, the system 226 continuously refines its tagging process based on user interactions and feedback, reducing manual effort and minimizing human error.

Additionally, one or more embodiments introduce real-time anomaly detection and remediation capabilities. This proactive approach enables the system 226 to identify and address potential misuse or manipulation of digital assets promptly, safeguarding brand integrity. The integration of predictive tagging further anticipates future needs, ensuring that the system 226 remains adaptive to changing trends and user behaviors.

Overall, these technical improvements streamline digital asset workflows, enhance metadata quality, and provide organizations with dynamic control over their multimedia content, addressing the challenges of modern digital asset management.

While the foregoing is directed to embodiments of the present disclosure, other and further embodiments of the present disclosure may be devised without departing from the basic scope thereof, and the scope thereof is determined by the claims that follow.

What is claimed is:

1. A computer-implemented method for performing real-time context-aware digital assessment management to identify and prevent misuse of a digital asset, the method comprising:

training a digital asset artificial intelligence (AI) model to automatically tag digital assets with descriptive tags corresponding to relevant contextual information associated with the digital assets;

detecting usage of at least one digital asset of the digital assets;

analyzing, using the digital asset AI model, the usage by analyzing the descriptive tags corresponding to relevant contextual information associated with the at least one of the digital assets detected as being used to identify anomalies associated with the at least one digital asset;

responsive to identifying an anomaly associated with the at least one digital asset, determining, using the digital asset AI model, whether the anomaly exceeds a predetermined sensitivity threshold; and responsive to determining that the anomaly associated with the at least one digital asset exceeds the predetermined sensitivity threshold, generating, using the digital asset AI model, a real-time remediation action based on the anomaly.

2. The computer-implemented method of claim 1, wherein the anomaly is digital content manipulation of the digital asset.

3. The computer-implemented method of claim 1, wherein the real-time remediation action is selected from a group of remediation actions consisting of relocating the digital asset, altering digital content of the digital asset, temporarily removing the digital asset, and permanently removing the digital asset.

4. The computer-implemented method of claim 1, wherein generating the real-time remediation action is based on the anomaly and a degree of sensitivity associated with the anomaly.

5. The computer-implemented method of claim 1, wherein the digital asset AI model is an attention general adversarial network (attention GAN).

6. The computer-implemented method of claim 1, wherein the digital asset AI model is self-refining based on learned auto-tagging and an in-context learning approach coupled with user interactions and predictive intents.

7. The computer-implemented method of claim 1, further comprising associating an additional descriptive tag with the at least one digital asset being used based on the usage.

8. The computer-implemented method of claim 1, wherein the digital asset AI model generates a sensitivity value associated with the anomaly, wherein the sensitivity value is compared to the predetermined sensitivity threshold to determine whether the anomaly associated with the at least one digital asset exceeds the predetermined sensitivity threshold.

9. A system comprising:
a memory comprising computer readable instructions; and
a processing device for executing the computer readable instructions, the computer readable instructions controlling the processing device to perform operations for performing real-time context-aware digital assessment management to identify and prevent misuse of a digital asset, the operations comprising:
training a digital asset artificial intelligence (AI) model to automatically tag digital assets with descriptive tags corresponding to relevant contextual information associated with the digital assets;
detecting usage of at least one digital asset of the digital assets;
analyzing, using the digital asset AI model, the usage by analyzing the descriptive tags corresponding to relevant contextual information associated with the at least one of the digital assets detected as being used to identify anomalies associated with the at least one digital asset;
responsive to identifying an anomaly associated with the at least one digital asset, determining, using the digital asset AI model, whether the anomaly exceeds a predetermined sensitivity threshold; and
responsive to determining that the anomaly associated with the at least one digital asset exceeds the predetermined sensitivity threshold, generating, using the digital asset AI model, a real-time remediation action based on the anomaly.

10. The system of claim 9, wherein the anomaly is digital content manipulation of the digital asset.

11. The system of claim 9, wherein the real-time remediation action is selected from a group of remediation actions consisting of relocating the digital asset, altering digital content of the digital asset, temporarily removing the digital asset, and permanently removing the digital asset.

12. The system of claim 9, wherein generating the real-time remediation action is based on the anomaly and a degree of sensitivity associated with the anomaly.

13. The system of claim 9, wherein the digital asset AI model is an attention general adversarial network (attention GAN).

14. The system of claim 9, wherein the digital asset AI model is self-refining based on learned auto-tagging and an in-context learning approach coupled with user interactions and predictive intents.

15. The system of claim 9, the operations further comprising associating an additional descriptive tag with the at least one digital asset being used based on the usage.

16. The system of claim 9, wherein the digital asset AI model generates a sensitivity value associated with the anomaly, wherein the sensitivity value is compared to the predetermined sensitivity threshold to determine whether the anomaly associated with the at least one digital asset exceeds the predetermined sensitivity threshold.

17. A computer program product for performing real-time context-aware digital assessment management to identify and prevent misuse of a digital asset, the computer program product comprising:
a set of one or more computer-readable storage media;
program instructions, collectively stored in the set of one or more storage media, for causing a processor set to perform the following computer operations:
training a digital asset artificial intelligence (AI) model to automatically tag digital assets with descriptive tags corresponding to relevant contextual information associated with the digital assets;
detecting usage of at least one digital asset of the digital assets;
analyzing, using the digital asset AI model, the usage by analyzing the descriptive tags corresponding to relevant contextual information associated with the at least one of the digital assets detected as being used to identify anomalies associated with the at least one digital asset;
responsive to identifying an anomaly associated with the at least one digital asset, determining, using the digital asset AI model, whether the anomaly exceeds a predetermined sensitivity threshold; and
responsive to determining that the anomaly associated with the at least one digital asset exceeds the predetermined sensitivity threshold, generating, using the digital asset AI model, a real-time remediation action based on the anomaly.

18. The computer program product of claim 17, wherein the anomaly is digital content manipulation of the digital asset.

19. The computer program product of claim 17, wherein the real-time remediation action is selected from a group of remediation actions consisting of relocating the digital asset, altering digital content of the digital asset, temporarily removing the digital asset, and permanently removing the digital asset.

20. The computer program product of claim 17, wherein generating the real-time remediation action is based on the anomaly and a degree of sensitivity associated with the anomaly.

* * * * *